US011959527B2

(12) United States Patent
Satake et al.

(10) Patent No.: US 11,959,527 B2
(45) Date of Patent: Apr. 16, 2024

(54) VIBRATION ISOLATOR

(71) Applicant: Prospira Corporation, Kanagawa (JP)

(72) Inventors: Yuki Satake, Tokyo (JP); Rei Mikoshiba, Tokyo (JP); Akira Ueki, Tokyo (JP); Yasuyuki Nagashima, Tokyo (JP)

(73) Assignee: Prospira Corporation, Kawasaki (JP)

( * ) Notice: Subject to any disclaimer, the term of this patent is extended or adjusted under 35 U.S.C. 154(b) by 572 days.

(21) Appl. No.: 17/050,868

(22) PCT Filed: May 10, 2019

(86) PCT No.: PCT/JP2019/018695
§ 371 (c)(1),
(2) Date: Oct. 27, 2020

(87) PCT Pub. No.: WO2019/216403
PCT Pub. Date: Nov. 14, 2019

(65) Prior Publication Data
US 2021/0239180 A1 Aug. 5, 2021

(30) Foreign Application Priority Data
May 10, 2018 (JP) ................................. 2018-091483

(51) Int. Cl.
*F16F 13/10* (2006.01)
*B60K 5/12* (2006.01)
*F16F 13/26* (2006.01)

(52) U.S. Cl.
CPC .......... *F16F 13/107* (2013.01); *B60K 5/1208* (2013.01); *F16F 2228/007* (2013.01); *F16F 2232/08* (2013.01)

(58) Field of Classification Search
CPC ...... F16F 13/10; F16F 13/107; F16F 2232/08; F16F 2228/007; F16F 13/106;
(Continued)

(56) References Cited

U.S. PATENT DOCUMENTS 4,651,980 A * 3/1987 Morita .................. F16F 13/106
267/140.3
4,679,776 A * 7/1987 Remmel ............... F16F 13/106
267/221
(Continued)

FOREIGN PATENT DOCUMENTS

CN 101285513 A 10/2008
CN 106574682 A 4/2017
(Continued)

OTHER PUBLICATIONS

Search Report dated Aug. 27, 2021, from the China National Intellectual Property Administration in application No. 2019800304544.
(Continued)

*Primary Examiner* — Robert A. Siconolfi
*Assistant Examiner* — James K Hsiao
(74) *Attorney, Agent, or Firm* — KENJA IP LAW PC (57) ABSTRACT

In a vibration isolator of the present invention, an orifice passage (24) configured to allow a main liquid chamber (14) and an auxiliary liquid chamber (15) to communicate with each other, a plurality of first communication holes (42a) configured to allow the main liquid chamber and an accommodation chamber (42) to communicate with each other, and a second communication hole (42b) configured to allow the auxiliary liquid chamber and the accommodation chamber to communicate with each other are formed in a partition member (16), a tubular member (21) that protrudes in an axial direction toward an elastic body is formed on a first wall surface (16b) of the partition member in which the first communication holes are opened and which constitutes part of an inner surface of the main liquid chamber, and the plurality of first communication holes are opened in both of an inner portion (16f) of the first wall surface positioned (Continued)

inside the tubular member and an outer portion (16g) of the first wall surface positioned outside the tubular member.

8 Claims, 3 Drawing Sheets

(58) Field of Classification Search
CPC .............. F16F 13/266; F16F 2222/12; F16F 2224/025; B62K 5/1208
See application file for complete search history.

(56) References Cited

U.S. PATENT DOCUMENTS

| | | | | |
|---|---|---|---|---|
| 4,708,329 A * | 11/1987 | Tabata | ............... | F16F 13/10 |
| | | | | 267/140.13 |
| 4,773,634 A * | 9/1988 | Hamaekers | ............ | F16F 13/106 |
| | | | | 137/493 |
| 4,903,951 A * | 2/1990 | Miyamoto | ............ | F16F 13/105 |
| | | | | 267/140.13 |
| 4,925,162 A * | 5/1990 | Kojima | ............... | F16F 13/106 |
| | | | | 267/140.13 |
| 5,102,105 A * | 4/1992 | Hamaekers | ............. | F16F 13/18 |
| | | | | 180/902 |
| 6,390,459 B2 * | 5/2002 | Saitoh | ................ | F16F 13/106 |
| | | | | 267/140.13 |
| 6,612,554 B1 * | 9/2003 | Linn | ................ | F16F 13/105 |
| | | | | 267/140.13 |
| 6,637,734 B2 * | 10/2003 | Thomazeau | ........ | F16F 13/103 |
| | | | | 267/140.13 |
| 6,793,206 B2 * | 9/2004 | Reh | .................. | F16F 13/106 |
| | | | | 267/140.13 |
| 6,923,435 B2 * | 8/2005 | Pizanti | ............... | F16F 13/105 |
| | | | | 267/140.13 |
| 7,258,331 B2 * | 8/2007 | Schneider | ............ | F16F 13/105 |
| | | | | 267/140.13 |
| 7,344,128 B2 * | 3/2008 | Muramatsu | ........ | F16F 13/106 |
| | | | | 267/140.13 |
| 7,802,777 B2 * | 9/2010 | Katayama | ............ | F16F 13/107 |
| | | | | 267/140.13 |
| 8,292,273 B2 * | 10/2012 | Muraoka | ........... | F16F 13/106 |
| | | | | 267/140.13 |
| 8,474,799 B2 * | 7/2013 | Michiyama | ........ | F16F 13/106 |
| | | | | 267/140.13 |
| 9,046,147 B2 * | 6/2015 | Tsutsumi | ............ | F16F 13/106 |
| 9,347,516 B2 * | 5/2016 | Kadowaki | ............ | F16F 13/106 |
| 9,365,101 B2 * | 6/2016 | Okumura | ............. | F16F 13/106 |
| 9,366,309 B2 * | 6/2016 | Marienfeld | ........ | F16F 13/10 |
| 9,488,246 B2 * | 11/2016 | Satori | ................ | F16F 13/08 |
| 9,719,575 B2 | 8/2017 | Kojima | | |
| 9,726,251 B2 * | 8/2017 | Nagasawa | ........... | F16F 13/08 |
| 9,878,604 B2 * | 1/2018 | Furusawa | ............ | F16F 13/264 |
| 10,030,738 B2 * | 7/2018 | Ueki | .................. | F16F 13/107 |
| 10,422,404 B2 * | 9/2019 | Oniwa | ................ | F16F 13/1409 |
| 10,436,281 B2 * | 10/2019 | Kim | ................... | F16F 13/105 |
| 10,584,761 B2 * | 3/2020 | Fourman | ............ | F16F 13/106 |
| 10,589,615 B2 * | 3/2020 | Chern | .................. | B60K 5/04 |
| 10,781,881 B2 * | 9/2020 | Ishikawa | ............. | F16F 13/106 |
| 11,428,290 B2 * | 8/2022 | Ueki | .................. | F16F 13/10 |
| 2002/0043748 A1 * | 4/2002 | Meyer | ............... | F16F 13/106 |
| | | | | 267/140.11 |
| 2003/0030202 A1 | 2/2003 | Thomazeau et al. | | |
| 2003/0038414 A1 | 2/2003 | Pizanti et al. | | |
| 2003/0085498 A1 | 5/2003 | Reh et al. | | |
| 2005/0206056 A1 * | 9/2005 | Maeno | ............... | F16F 13/106 |
| | | | | 267/141 |
| 2008/0290573 A1 * | 11/2008 | Katayama | ............ | F16F 13/106 |
| | | | | 267/292 |
| 2009/0140476 A1 * | 6/2009 | Michiyama | ........ | F16F 13/106 |
| | | | | 267/140.13 |
| 2009/0140477 A1 * | 6/2009 | Michiyama | ........ | F16F 13/106 |
| | | | | 267/140.13 |
| 2009/0243171 A1 * | 10/2009 | Nanno | .............. | F16F 13/107 |
| | | | | 267/140.13 |
| 2009/0283945 A1 * | 11/2009 | Kojima | ................. | F16F 13/107 |
| | | | | 267/140.13 |
| 2010/0072683 A1 * | 3/2010 | Saito | .................... | F16F 13/106 |
| | | | | 267/140.13 |
| 2010/0102495 A1 * | 4/2010 | Okumura | ............. | F16F 13/108 |
| | | | | 267/140.13 |
| 2013/0069289 A1 * | 3/2013 | Ishikawa | ............. | F16F 13/106 |
| | | | | 267/140.13 |
| 2013/0154171 A1 * | 6/2013 | Nishi | ................... | F16F 13/106 |
| | | | | 267/140.13 |
| 2014/0327199 A1 * | 11/2014 | Kanaya | ............... | F16F 13/106 |
| | | | | 267/140.13 |
| 2015/0028530 A1 | 1/2015 | Kanaya et al. | | |
| 2015/0330476 A1 * | 11/2015 | Satori | .................. | B60K 5/1208 |
| | | | | 267/140.13 |
| 2015/0337919 A1 * | 11/2015 | Kojima | ................. | F16F 13/106 |
| | | | | 267/140.13 |
| 2016/0053844 A1 * | 2/2016 | Nagasawa | ............ | F16F 13/106 |
| | | | | 267/140.13 |
| 2016/0053845 A1 * | 2/2016 | Ueki | .................... | B60K 5/1208 |
| | | | | 267/140.13 |
| 2016/0053846 A1 * | 2/2016 | Nagasawa | ............ | B60K 5/1208 |
| | | | | 267/140.13 |
| 2016/0223048 A1 | 8/2016 | Kojima | | |
| 2017/0023089 A1 * | 1/2017 | Ueki | ..................... | F16F 13/107 |
| 2017/0030428 A1 * | 2/2017 | Ueki | ..................... | F16F 13/107 |
| 2017/0089420 A1 * | 3/2017 | Kadowaki | ............ | B60K 5/1208 |
| 2017/0335920 A1 * | 11/2017 | Kanaya | ................ | B60K 5/1208 |
| 2018/0051769 A1 * | 2/2018 | Kim | ..................... | F16F 13/106 |
| 2018/0073591 A1 * | 3/2018 | Nagasawa | ............ | F16F 13/107 |
| 2019/0017567 A1 * | 1/2019 | Kim | ..................... | F16F 13/105 |
| 2019/0061509 A1 * | 2/2019 | Kim | ..................... | F16F 13/262 |
| 2019/0092155 A1 * | 3/2019 | Inoue | ................... | F16F 13/305 |
| 2019/0128364 A1 * | 5/2019 | Kim | ..................... | F16H 57/025 |
| 2020/0400210 A1 * | 12/2020 | Ueki | .................... | F16F 13/107 |
| 2022/0373058 A1 | 11/2022 | Mikoshiba et al. | | |
| 2022/0397177 A1 | 12/2022 | Satake et al. | | |
| 2022/0403911 A1 | 12/2022 | Mikoshiba et al. | | |
| 2022/0403912 A1 | 12/2022 | Mikoshiba et al. | | |

FOREIGN PATENT DOCUMENTS

| | | |
|---|---|---|
| EP | 1 283 377 A1 | 2/2003 |
| GB | 2 282 430 A | 4/1995 |
| JP | 01-193426 A | 8/1989 |
| JP | H0522890 U | 3/1993 |
| JP | 2002-327789 A | 11/2002 |
| JP | 2003130125 A | 5/2003 |
| JP | 2006200590 A | 8/2006 |
| JP | 2007182930 A | 7/2007 |
| JP | 2007218420 A | 8/2007 |
| JP | 2009243543 A | 10/2009 |
| JP | 2010-031989 A | 2/2010 |
| JP | 2013032828 A | 2/2013 |
| JP | 2013228003 A | 11/2013 |
| JP | 2013228004 A | 11/2013 |
| JP | 2013231454 A | 11/2013 |
| JP | 5642241 B1 | 12/2014 |
| JP | 2015-059655 A | 3/2015 |
| JP | 2021076163 A | 5/2021 |
| JP | 2021076164 A | 5/2021 |
| JP | 2021076165 A | 5/2021 |
| JP | 2021076166 A | 5/2021 |
| JP | 2021076168 A | 5/2021 |
| JP | 2021076169 A | 5/2021 |
| JP | 2021076170 A | 5/2021 |
| JP | 2021076171 A | 5/2021 |
| JP | 2021076172 A | 5/2021 |
| JP | 2021076173 A | 5/2021 |

OTHER PUBLICATIONS

International search report for PCT/JP2019/018695 dated Jul. 23, 2019.

Extended European Search Report dated Dec. 1, 2021 in European Application No. 19799394.2.

(56) References Cited

OTHER PUBLICATIONS

Dec. 28, 2020, International Search Report issued in the International Patent Application No. PCT/JP2020/041719.
Dec. 8, 2020, International Search Report issued in the International Patent Application No. PCT/JP2020/041370.
Dec. 8, 2020, International Search Report issued in the International Patent Application No. PCT/JP2020/041609.
Dec. 8, 2020, International Search Report issued in the International Patent Application No. PCT/JP2020/041665.
Nov. 10, 2020, International Search Report issued in the International Patent Application No. PCT/JP2020/038572.
May 10, 2022, International Preliminary Report on Patentability issued in the International Patent Application No. PCT/JP2020/038572.
May 10, 2022, International Preliminary Report on Patentability issued in the International Patent Application No. PCT/JP2020/041370.
May 10, 2022, International Preliminary Report on Patentability issued in the International Patent Application No. PCT/JP2020/041609.
May 10, 2022, International Preliminary Report on Patentability issued in the International Patent Application No. PCT/JP2020/041665.
May 10, 2022, International Preliminary Report on Patentability issued in the International Patent Application No. PCT/JP2020/041719.
Nov. 10, 2020, International Preliminary Report on Patentability issued in the International Patent Application No. PCT/JP2019/018695.

* cited by examiner

VIBRATION ISOLATOR

CROSS-REFERENCE TO RELATED APPLICATIONS

This application is a National Stage of International Application No. PCT/JP2019/018695 filed May 10, 2019, which claims priority under U.S.C. § 119(a) to Japanese Patent Application No. 2018-091483 filed on May 10, 2018.

TECHNICAL FIELD

The present invention relates to a vibration isolator which is applied to, for example, an automobile, an industrial machine, or the like, and absorbs and attenuates vibrations of a vibration generating unit such as an engine.

Priority is claimed on Japanese Patent Application No. 2018-091483, filed in Japan on May 10, 2018, the content of which is incorporated herein by reference.

BACKGROUND ART

A conventionally-known vibration isolator includes a tubular first mounting member connected to one of a vibration generating unit and a vibration receiving unit and a second mounting member connected to the other thereof, an elastic body elastically connecting the mounting members to each other, a partition member which partitions a liquid chamber in the first mounting member, in which liquid is sealed, into a main liquid chamber having the elastic body as part of a partition wall thereof and an auxiliary liquid chamber, and a movable member accommodated in an accommodation chamber provided in the partition member so as to be deformable or displaceable, and an orifice passage which allows the main liquid chamber and the auxiliary liquid chamber to communicate with each other, a plurality of first communication holes which allow the main liquid chamber and the accommodation chamber to communicate with each other, and a second communication hole which allows the auxiliary liquid chamber and the accommodation chamber to communicate with each other are formed in the partition member.

In this vibration isolator, when the idle vibration having a relatively high frequency among the low frequency vibrations with a frequency of less than 200 Hz is input to the vibration isolator in the axial direction, the movable member is deformed or displaced inside the accommodation chamber and the liquid inside the liquid chamber is flowed through the first communication holes and the second communication hole, thereby the idle vibration is attenuated and absorbed, and when the shake vibration having a relatively low frequency is input to the vibration isolator in the axial direction, the liquid inside the liquid chamber is flowed through the orifice passage, thereby the shake vibration is attenuated and absorbed.

CITATION LIST

Patent Document

[Patent Document 1]
Japanese Unexamined Patent Application, First Publication No. 2002-327789

SUMMARY OF INVENTION

Technical Problem

In a conventional vibration isolator, it is difficult to attenuate and absorb medium frequency vibrations with a frequency of 200 Hz to 1000 Hz.

The present invention has been made in view of the above-described circumstances, and an objective thereof is to provide a vibration isolator which can attenuate and absorb medium frequency vibrations.

Solution to Problem

A vibration isolator according to the present invention includes: a tubular first mounting member connected to one of a vibration generating unit and a vibration receiving unit and a second mounting member connected to the other thereof; an elastic body elastically connecting the first and second mounting members to each other; a partition member which partitions a liquid chamber in the first mounting member, in which liquid is sealed, into a main liquid chamber having the elastic body as part of a partition wall thereof and an auxiliary liquid chamber, the main liquid chamber and the auxiliary liquid chamber being disposed in an axial direction along a central axis of the first mounting member; and a movable member accommodated in an accommodation chamber provided in the partition member so as to be deformable or displaceable, in which an orifice passage, a plurality of first communication holes, and a second communication hole are formed in the partition member, the orifice passage being configured to allow the main liquid chamber and the auxiliary liquid chamber to communicate with each other, the plurality of first communication holes being configured to allow the main liquid chamber and the accommodation chamber to communicate with each other, and the second communication hole being configured to allow the auxiliary liquid chamber and the accommodation chamber to communicate with each other, a tubular member that protrudes in the axial direction toward the elastic body is formed on a first wall surface of the partition member in which the first communication holes are opened, the first wall surface constituting part of an inner surface of the main liquid chamber, and the plurality of first communication holes are opened in both of an inner portion of the first wall surface positioned inside the tubular member and an outer portion of the first wall surface positioned outside the tubular member.

Effects of Invention

According to the present invention, medium frequency vibrations can be attenuated and absorbed.

DESCRIPTION OF EMBODIMENTS

Hereinafter, a vibration isolator according to an embodiment of the present invention will be described with reference to FIGS. 1 and 2.

Figure 1:
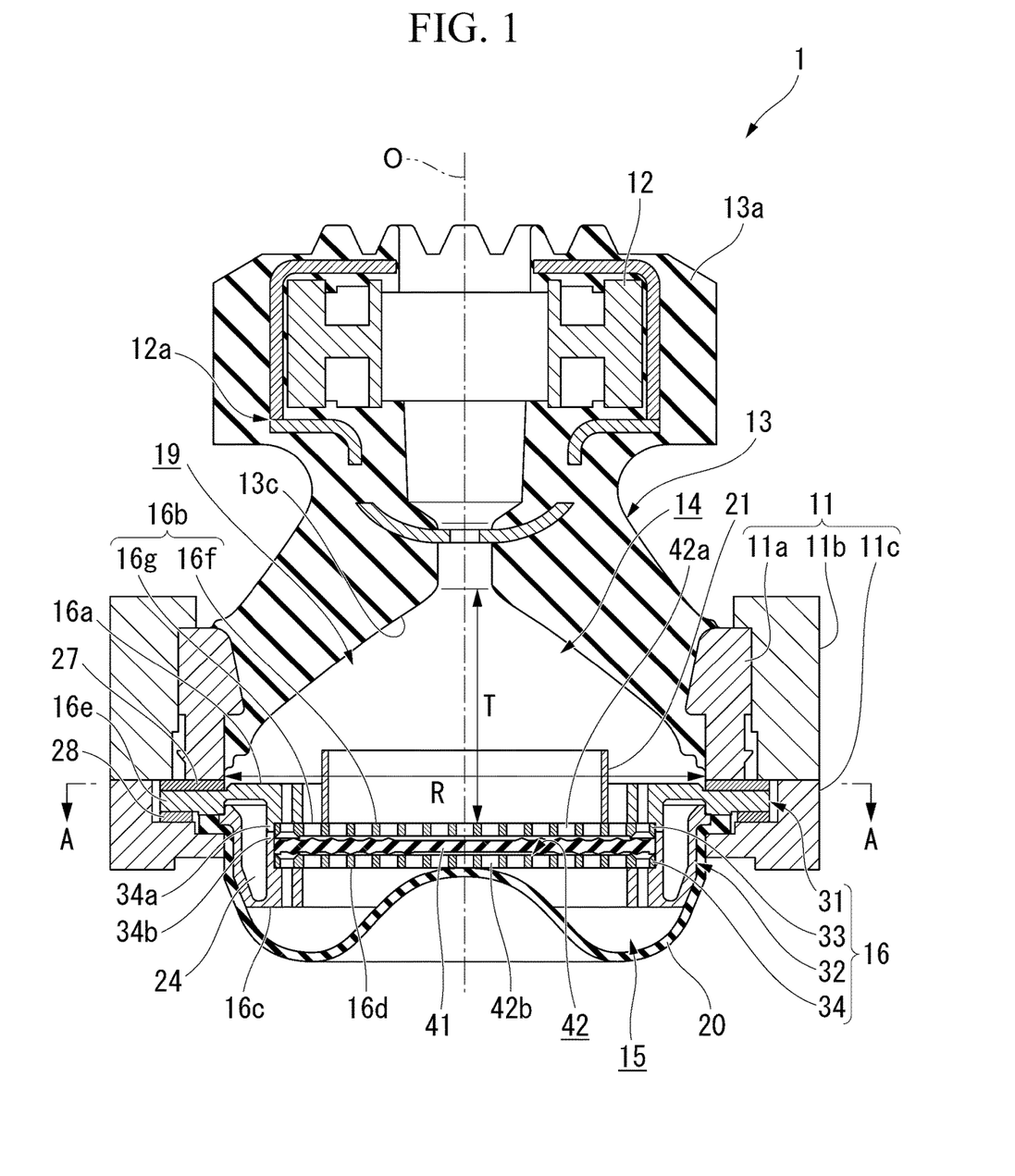
FIG. 1 is a longitudinal sectional view of a vibration isolator according to a first embodiment of the present invention.

As shown in FIG. 1, a vibration isolator 1 is a liquid-sealed type vibration isolator, and includes a tubular first mounting member 11 connected to one of a vibration generating unit and a vibration receiving unit, a second mounting member 12 connected to the other of the vibration generating unit and the vibration receiving unit, an elastic body 13 elastically connecting the first mounting member 11 and the second mounting member 12 to each other, a partition member 16 which partitions a liquid chamber 19 in the first mounting member 11, in which liquid is sealed, into a main liquid chamber 14 having the elastic body 13 as part of a partition wall thereof and an auxiliary liquid chamber 15, and a movable member 41 accommodated in an accommodation chamber 42 provided in the partition member 16 so as to be deformable or displaceable.

Hereinafter, a direction along a central axis O of the first mounting member 11 is referred to as an axial direction. The second mounting member 12 side in the axial direction is referred to as an upper side, and the partition member 16 side is referred to as a lower side. In a plan view of the vibration isolator 1 seen from the axial direction, a direction perpendicular to the central axis O is referred to as a radial direction, and a direction around the central axis O is referred to as a circumferential direction.

The first mounting member 11, the second mounting member 12, and the elastic body 13 each have a circular shape or an annular shape in a plan view, and are disposed coaxially with the central axis O.

When the vibration isolator 1 is attached to, for example, an automobile, the second mounting member 12 is connected to an engine serving as the vibration generating unit, and the first mounting member 11 is connected to a vehicle body serving as the vibration receiving unit. Thereby, transmission of vibrations from the engine and the like to the vehicle body can be suppressed. The first mounting member 11 may be connected to the vibration generating unit, and the second mounting member 12 may be connected to the vibration receiving unit.

The first mounting member 11 includes an inner tubular part 11a, an outer tubular part 11b, and a lower support part 11c.

The inner tubular part 11a is fitted into the outer tubular part 11b. The lower support part 11c is formed in an annular shape. A lower end opening edge of the outer tubular part 11b is disposed on an upper surface in an outer circumferential portion of the lower support part 11c. The first mounting member 11 is formed in a cylindrical shape as a whole. The first mounting member 11 is connected to the vehicle body or the like serving as the vibration receiving unit via a bracket (not shown).

The second mounting member 12 is formed in an annular shape. The second mounting member 12 is positioned above and radially inside the first mounting member 11. The outer diameter of the second mounting member 12 is smaller than the inner diameter of the first mounting member 11. The second mounting member 12 is connected to the engine or the like serving as the vibration generating unit via a fitting member (not shown) by fitting the fitting member to the inside of the second mounting member 12.

The relative position between the first mounting member 11 and the second mounting member 12 is not limited to the illustrated example, and may be changed as appropriate. The outer diameter of the second mounting member 12 may be equal to or larger than the inner diameter of the first mounting member 11.

The elastic body 13 is formed in a tubular shape extending in the axial direction. The diameter of the elastic body 13 gradually increases from an upper side toward a lower side.

Both end portions of the elastic body 13 in the axial direction are respectively connected to the first mounting member 11 and the second mounting member 12. An upper end portion of the elastic body 13 is connected to the second mounting member 12 and a lower end portion of the elastic body 13 is connected to the first mounting member 11. The elastic body 13 closes an upper end opening of the first mounting member 11. The lower end portion of the elastic body 13 is connected to an inner circumferential surface of the inner tubular part 11a of the first mounting member 11. The upper end portion of the elastic body 13 is connected to a lower surface of the second mounting member 12. The elastic body 13 is made of, for example, a rubber material, and is vulcanization-bonded to the first mounting member 11 and the second mounting member 12. The thickness of the elastic body 13 gradually decreases from the upper side toward the lower side. The elastic body 13 may be made of a synthetic resin material or the like.

A rubber stopper 13a that covers an outer circumferential surface and an upper surface of the second mounting member 12 is integrally formed with the upper end portion of the elastic body 13. An outer shell 12a that surrounds the second mounting member 12 is embedded in the elastic body 13 and the rubber stopper 13a.

A diaphragm 20 is made of an elastic material such as rubber or soft resin and is formed in a bottomed cylindrical shape. An upper end portion of the diaphragm 20 is sandwiched between an inner circumferential portion of the lower support part 11c of the first mounting member 11 and an outer circumferential portion of the partition member 16, and thereby liquid-tightness inside the diaphragm 20 is ensured and a lower end opening of the first mounting member 11 is closed.

In the illustrated example, a bottom portion of the diaphragm 20 has a shape in which an outer circumferential portion thereof is deep and a central portion thereof is shallow. However, various conventionally known shapes other than this shape can be adopted as the shape of the diaphragm 20.

As described above, as the elastic body 13 closes the upper end opening of the first mounting member 11 and the diaphragm 20 closes the lower end opening of the first mounting member 11, the liquid chamber 19 in which the liquid is sealed in a liquid-tight manner is formed inside the first mounting member 11. The liquid is sealed (filled) in the liquid chamber 19. Ethylene glycol, water, silicone oil or the like may be used as the liquid.

The liquid chamber 19 is partitioned by the partition member 16 into the main liquid chamber 14 and the auxiliary liquid chamber 15 which are disposed in the axial direction. Part of a wall surface of the main liquid chamber 14 is formed by an inner circumferential surface 13c of the elastic body 13, the main liquid chamber 14 is a space surrounded by the elastic body 13 and the partition member 16, and the internal volume of the main liquid chamber 14 changes according to deformation of the elastic body 13.

The auxiliary liquid chamber 15 is a space surrounded by the diaphragm 20 and the partition member 16, and the internal volume of the auxiliary liquid chamber 15 changes according to deformation of the diaphragm 20. The vibration isolator 1 having such a configuration is a compression type device which is installed such that the main liquid chamber 14 is positioned on an upper side in the vertical direction and the auxiliary liquid chamber 15 is positioned on a lower side in the vertical direction.

A plurality of first communication holes 42a and second communication holes 42b are formed in the partition member 16, each first communication hole 42a allows the main liquid chamber 14 and the accommodation chamber 42 to communicate with each other, and each second communication hole 42b allows the auxiliary liquid chamber 15 and the accommodation chamber 42 to communicate with each other. The plurality of second communication holes 42b are formed in the partition member 16, and the number of the first communication holes 42a is the same as the number of the second communication holes 42b. The inner diameter of the first communication hole 42a is the same as the inner diameter of the second communication hole 42b. A single second communication hole 42b may be formed in the partition member 16.

An upper wall surface of the partition member 16 constituting part of an inner surface of the main liquid chamber 14 and a lower wall surface of the partition member 16 constituting part of an inner surface of the auxiliary liquid chamber 15 each have a circular shape coaxially with the central axis O when seen in the axial direction. The diameters of the upper wall surface and the lower wall surface of the partition member 16 are equal to each other. The upper wall surface of the partition member 16 faces the inner circumferential surface 13c of the elastic body 13 in the axial direction, and the lower wall surface of the partition member 16 faces an inner surface of the diaphragm 20 in the axial direction.

In the illustrated example, a recessed portion is formed in the upper wall surface of the partition member 16 over the entire region thereof except an outer circumferential edge portion 16a. The plurality of first communication holes 42a are opened in a bottom surface (hereinafter, referred to as a first wall surface) 16b of this recessed portion over the entire region thereof. A recessed portion is formed in the lower wall surface of the partition member 16 over the entire region thereof except an outer circumferential edge portion 16c. The plurality of second communication holes 42b are opened in a bottom surface (hereinafter, referred to as a second wall surface) 16d of this recessed portion over the entire region thereof. The recessed portions of the upper wall surface and the lower wall surface each have a circular shape coaxially with the central axis O when seen in the axial direction, and the sizes such as the inner diameters and depths of the recessed portions are equal to each other.

The accommodation chamber 42 is formed in the partition member 16 and is positioned between the first wall surface 16b and the second wall surface 16d in the axial direction. The accommodation chamber 42 is formed in a circular shape coaxially with the central axis O when seen in the axial direction. The diameter of the accommodation chamber 42 is larger than the diameter of the first wall surface 16b and is also larger than the diameter of the second wall surface 16d.

The movable member 41 is made of, for example, a rubber material, and is formed in a plate shape whose front and rear surfaces face the axial direction. The movable member 41 is formed in a circular shape coaxially with the central axis O when seen in the axial direction.

An orifice passage 24 that allows the main liquid chamber 14 and the auxiliary liquid chamber 15 to communicate with each other is formed in the partition member 16. The orifice passage 24 is formed in the partition member 16 and is positioned between the outer circumferential edge portion 16a of the upper wall surface of the partition member 16 and the outer circumferential edge portion 16c of the lower wall surface of the partition member 16 in the axial direction. An upper edge of the orifice passage 24 is positioned above the first wall surface 16b, and a lower edge of the orifice passage 24 is positioned below the second wall surface 16d. A flow path cross-sectional shape of the orifice passage 24 is formed in a rectangular shape which is long in the axial direction. The resonance frequency of the orifice passage 24 is lower than the resonance frequency of the first communication hole 42a and is also lower than the resonance frequency of the second communication hole 42b.

Figure 2:
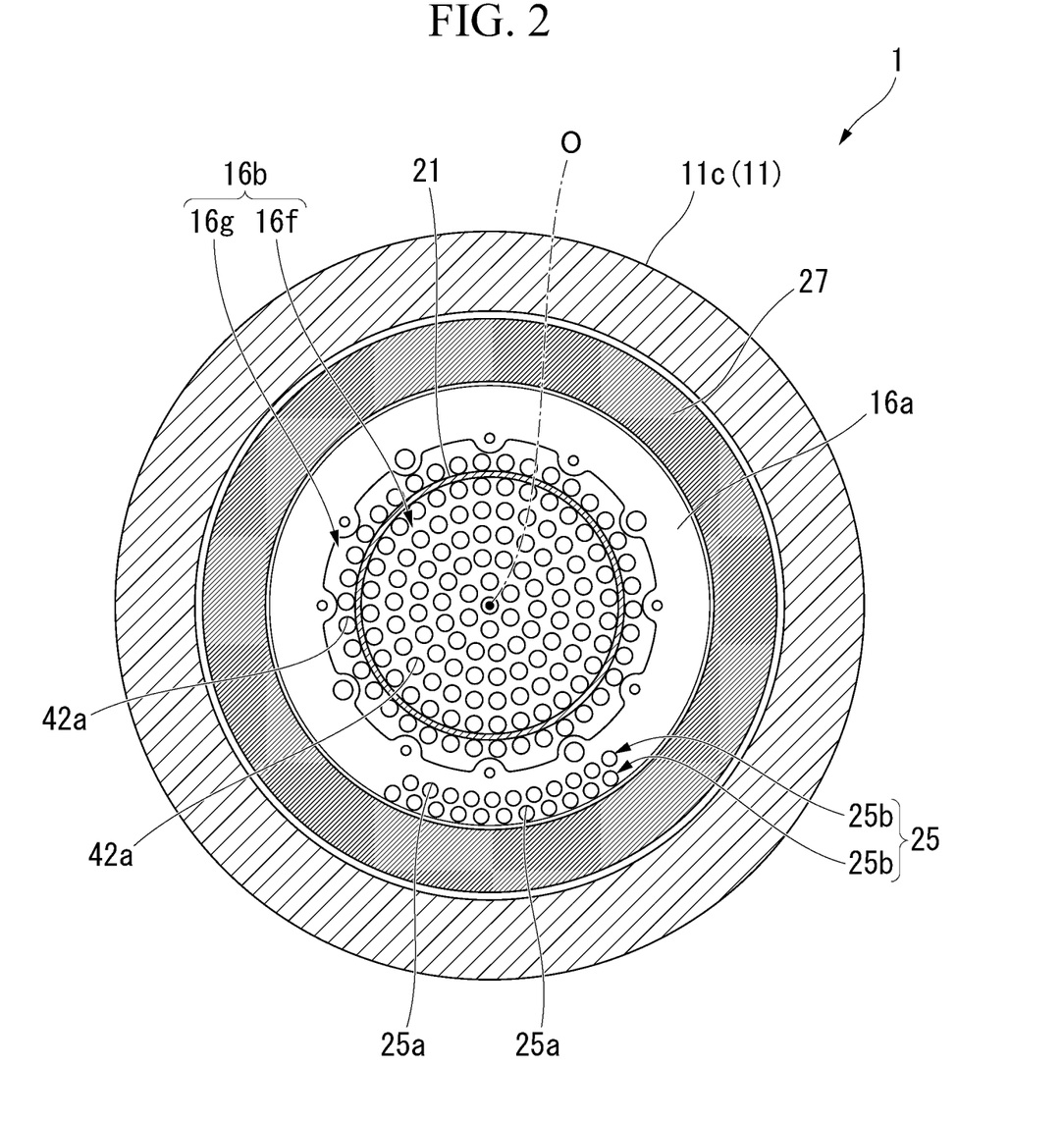
FIG. 2 is a sectional view of the vibration isolator taken along line A-A of FIG. 1.

As shown in FIG. 2, an opening portion 25 of the orifice passage 24 on the main liquid chamber 14 side is formed in the outer circumferential edge portion 16a of the upper wall surface of the partition member 16. The opening portion 25 is constituted by a plurality of hole lines 25b each having a plurality of through holes 25a arranged at intervals in the circumferential direction, and the plurality of hole lines 25b are disposed at different positions in the radial direction and the circumferential direction. The inner diameter of the through hole 25a is smaller than the inner diameter of the first communication hole 42a. Two hole lines 25b are disposed in the outer circumferential edge portion 16a of the upper wall surface of the partition member 16. The shift amount between the hole lines 25b in the circumferential direction and the shift amount between the hole lines 25b in the radial direction are each equal to the inner diameter of the through hole 25a.

An opening portion of the orifice passage 24 on the auxiliary liquid chamber 15 side is formed in the outer circumferential edge portion 16c of the lower wall surface of the partition member 16 and is formed by one opening whose opening area is larger than the opening area of the opening portion 25 on the main liquid chamber 14, that is, larger than the total of the opening areas of the plurality of the through holes 25a. The opening portion 25 of the orifice passage 24 on the main liquid chamber 14 side and the opening portion of the orifice passage 24 on the auxiliary liquid chamber 15 side are positioned radially outside the first communication holes 42a and the second communication holes 42b.

A flange part 16e that protrudes radially outward is formed on an upper end portion of the partition member 16 and continuously extends over the entire circumference thereof. An upper surface of the flange part 16e is in contact with the lower end opening edges of the inner tubular part 11a and the outer tubular part 11b of the first mounting member 11 via an annular upper sealing member 27. A lower surface of the flange part 16e is in contact with the upper surface in the inner circumferential portion of the lower support part 11c of the first mounting member 11 via an upper end opening edge of the diaphragm 20 and an annular lower sealing member 28 which surrounds the upper end opening edge of the diaphragm 20 from the outside in the radial direction.

The partition member 16 includes an upper tubular body 31 and a lower tubular body 32 which abut each other in the axial direction, an upper wall 33 which closes a lower end opening of the upper tubular body 31, and a lower wall 34 which closes an upper end opening of the lower tubular body 32. The partition member 16 may be integrally formed.

An upper end opening edge of the upper tubular body 31 is the above-described outer circumferential edge portion 16a of the upper wall surface of the partition member 16. The flange part 16e is formed on an upper end portion of the upper tubular body 31.

A circumferential groove that recesses upward and extends outward in the radial direction is formed in a portion of a lower end opening edge of the upper tubular body 31 positioned radially outside an inner circumferential portion thereof.

The upper wall 33 is fixed to the inner circumferential portion of the lower end opening edge of the upper tubular body 31. The first communication holes 42a are formed in the upper wall 33.

A circumferential groove that recesses downward is formed in an intermediate portion, in the radial direction, of the upper end opening edge of the lower tubular body 32 such as to face the circumferential groove of the upper tubular body 31 in the radial direction. The orifice passage 24 is constituted by this circumferential groove and the circumferential groove of the upper tubular body 31. An outer circumferential edge portion of the upper end opening edge of the lower tubular body 32 positioned radially outside the circumferential groove is in contact with the lower surface of the flange part 16e. The lower tubular body 32 is fitted into the upper end portion of the diaphragm 20, and the upper end portion of the diaphragm 20 is fitted into the lower support part 11c of the first mounting member 11. Thereby, the upper end portion of the diaphragm 20 is sandwiched in the radial direction between an outer circumferential surface of the lower tubular body 32 and an inner circumferential surface of the lower support part 11c.

The lower wall 34 is fixed to an inner circumferential portion of the upper end opening edge of the lower tubular body 32. The second communication holes 42b are formed in the lower wall 34.

Abutting protrusions 34a, 34b are formed on at least one of the inner circumferential portion of the lower end opening edge of the upper tubular body 31 and the inner circumferential portion of the upper end opening edge of the lower tubular body 32, and protrude toward and come in contact with the other thereof. In the illustrated example, the abutting protrusions 34a, 34b are formed on both of the inner circumferential portion of the lower end opening edge of the upper tubular body 31 and the inner circumferential portion of the upper end opening edge of the lower tubular body 32. The abutting protrusions 34a, 34b are formed in an annular shape coaxially with the central axis O, and the upper wall 33 and the lower wall 34 are disposed radially inside the abutting protrusions 34a, 34b in a state where the upper wall 33 and the lower wall 34 are spaced apart from each other in the axial direction. The accommodation chamber 42 is defined by a lower surface of the upper wall 33, an upper surface of the lower wall 34, and inner circumferential surfaces of the abutting protrusions 34a, 34b.

In the present embodiment, a tubular member 21 is provided on the first wall surface 16b of the partition member 16 in which the first communication holes 42a are opened and which constitutes part of the inner surface of the main liquid chamber 14, and the tubular member 21 protrudes in the axial direction toward the elastic body 13.

The tubular member 21 is formed in a cylindrical shape and is disposed coaxially with the central axis O. The tubular member 21 extends straight in the axial direction. The length of the tubular member 21 in the axial direction is equal to or larger than 20% of the maximum height T of the main liquid chamber 14 in the axial direction. In the illustrated example, the maximum height T of the main liquid chamber 14 in the axial direction is a distance, in the axial direction, between the first wall surface 16b and an upper end of the inner circumferential surface 13c of the elastic body 13 which gradually extends inward in the radial direction as it goes from the lower side toward the upper side. The length of the tubular member 21 in the axial direction is set such that the upper end portion of the tubular member 21 does not come in contact with the inner circumferential surface 13c of the elastic body 13 when static load in the axial direction is applied to the vibration isolator 1 or when vibration in the axial direction is input to the vibration isolator 1.

An upper portion of the tubular member 21 protrudes upward from an upper end opening portion of the recessed portion formed in the upper wall surface of the partition member 16. An outer circumferential surface of the upper portion of the tubular member 21 faces a lower end portion of the inner circumferential surface of the inner tubular part 11a of the first mounting member 11 and the lower end portion of the inner circumferential surface 13c of the elastic body 13 in the radial direction. The protruding length of the upper portion of the tubular member 21 from the upper end opening portion of the recessed portion is shorter than the depth of this recessed portion. Further, the protruding length is shorter than a distance, in the axial direction, between an upper end opening edge of the tubular member 21 and a portion of the inner circumferential surface 13c of the elastic body 13 facing the upper end opening edge of the tubular member 21 in the axial direction. The upper end opening edge of the tubular member 21 faces, in the axial direction, the portion of the inner circumferential surface 13c of the elastic body 13, which gradually extends inward in the radial direction as it goes from the lower side toward the upper side, positioned lower than a middle portion of the inner circumferential surface 13c in an extending direction thereof.

The radius of an inner circumferential surface of the tubular member 21 is larger than a distance, in the radial direction, between the outer circumferential surface of the tubular member 21 and an inner circumferential surface of the recessed portion formed in the upper wall surface of the partition member 16. The inner diameter of the tubular member 21 is equal to or larger than half of the maximum inner diameter R of the main liquid chamber 14. In the illustrated example, the maximum inner diameter R of the main liquid chamber 14 is the inner diameter of the lower end portion of the inner tubular part 11a of the first mounting member 11. The plane area of a portion (hereinafter referred to as an inner portion) 16f of the first wall surface 16b positioned inside the tubular member 21 is larger than the plane area of a portion (hereinafter referred to as an outer portion) 16g of the first wall surface 16b positioned outside the tubular member 21.

The plurality of first communication holes 42a are opened in both of the inner portion 16f and the outer portion 16g of the first wall surface 16b.

The total of the opening areas of the first communication holes 42a opened in the inner portion 16f is larger than the total of the opening areas of the first communication holes 42a opened in the outer portion 16g. The first communication holes 42a are arranged in the inner portion 16f at equal intervals over the entire region thereof. The first communication holes 42a are arranged in the outer portion 16g at equal intervals over the entire circumference thereof. A distance between the first communication holes 42a adjacent to each other is smaller than the inner diameter of the first communication hole 42a.

The tubular member 21 is connected to a portion of the first wall surface 16b positioned between the first communication holes 42a adjacent to each other so as not to overlap the first communication holes 42a. The tubular member 21 is disposed such that the inner circumferential surface and the outer circumferential surface thereof are in contact with the first communication holes 42a when seen in the axial direction.

In the vibration isolator 1 having such a configuration, when the idle vibration having a relatively high frequency among the low frequency vibrations is input to the vibration isolator 1 in the axial direction, the movable member 41 is deformed or displaced inside the accommodation chamber 42 and the liquid inside the liquid chamber 19 is flowed through the first communication holes 42a and the second communication holes 42b, and thereby this vibration is attenuated and absorbed. Further, when the shake vibration having a relatively low frequency among the low frequency vibrations is input to the vibration isolator 1 in the axial direction, the liquid inside the liquid chamber 19 is flowed through the orifice passage 24, and thereby this vibration is attenuated and absorbed.

As described above, according to the vibration isolator 1 of the present embodiment, the tubular member 21 that protrudes toward the elastic body 13 is provided on the first wall surface 16b of the partition member 16. Accordingly, when the elastic body 13 deforms in the secondary vibration mode due to input of the medium frequency vibration in the axial direction, in the vertical cross-sectional view thereof along the axial direction, since a node, which is conventionally generated in the middle portion of the elastic body 13, is shifted to the second mounting member 12 side due to, for example, the fact that the liquid between the inner circumferential surface of the main liquid chamber 14 and the outer circumferential surface of the upper portion of the tubular member 21 becomes difficult to flow, a portion of the elastic body 13 positioned on the first mounting member 11 side of the node is more easily deformed compared with a portion of the elastic body 13 positioned on the second mounting member 12 side of the node. Thereby, as the portion of the elastic body 13 positioned on the first mounting member 11 side of the node is positively deformed when the medium frequency vibration is input in the axial direction, the apparent rigidity of the elastic body 13 can be reduced, and this vibration can be attenuated and absorbed.

Further, according to the vibration isolator 1 of the present embodiment, the medium frequency vibration can be reduced by controlling the hydraulic pressure in the main liquid chamber 14.

For example in a case where the total area of the holes is constant, the hydraulic pressure in the main liquid chamber 14 when vibration or the like is input differs according to the shape of the holes provided in the partition member 16.

Similarly, the hydraulic pressure in the main liquid chamber 14 when vibration or the like is input differs between a case where the tubular member 21 is disposed on the partition member 16 and a case where the tubular member is not provided.

It is considered that since a space in the main liquid chamber 14 is divided by the tubular member 21 in the axial direction and the radial direction of the vibration isolator 1 and the divided spaces interact with each other, the medium frequency vibration can be reduced unlike a conventional case.

Further, as the plurality of first communication holes 42a are opened in both of the inner portion of the first wall surface 16b positioned inside the tubular member 21 and the outer portion of the first wall surface 16b positioned outside the tubular member 21, many first communication holes 42a can be arranged in the first wall surface 16b, and for example, the idle vibration having a relatively high frequency among low frequency vibrations can be reliably attenuated and absorbed.

Further, as the length of the tubular member 21 in the axial direction is equal to or larger than 20% of the maximum height T of the main liquid chamber 14 in the axial direction, the medium frequency vibration in the axial direction can be reliably attenuated and absorbed.

Further, as the inner diameter of the tubular member 21 is equal to or larger than half of the maximum inner diameter R of the main liquid chamber 14, the medium frequency vibration in the axial direction can be reliably attenuated and absorbed.

Next, a second embodiment according to the present invention will be described. The basic configuration of the second embodiment is the same as that of the first embodiment. Therefore, the same reference numerals will may be given to the same components and a description thereof may be omitted, and only different components may be described.

Figure 3:
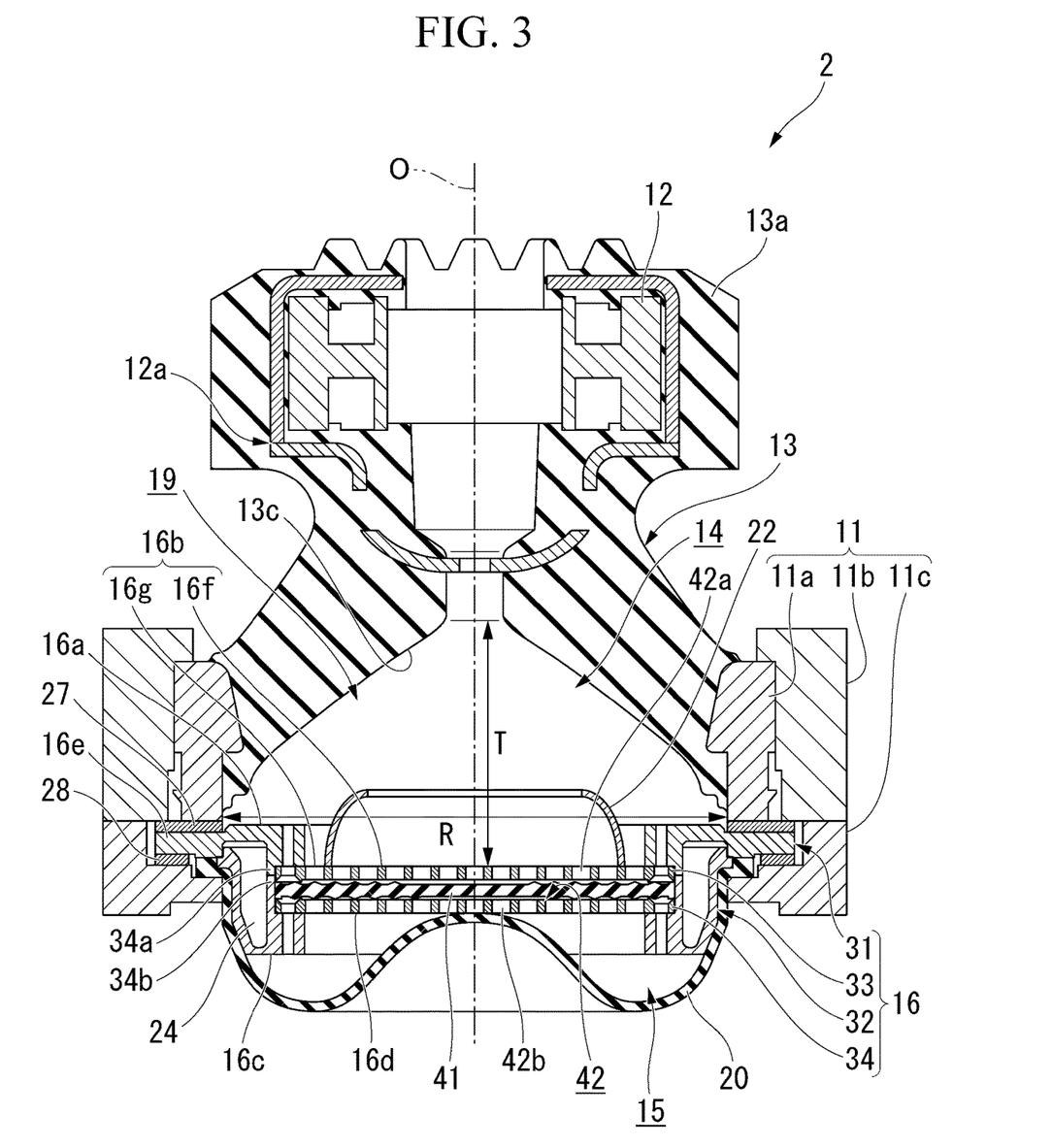
FIG. 3 is a longitudinal sectional view of a vibration isolator according to a second embodiment of the present invention.

As shown in FIG. 3, a tubular member 22 of a vibration isolator 2 according to this embodiment is formed such that the diameter of the tubular member 22 gradually decreases from a lower side toward an upper side. In the illustrated example, the tubular member 22 is formed in a curved dome shape. The tubular member 22 may be formed such that the diameter of the tubular member 22 gradually and linearly decreases from the lower side toward the upper side.

According to the vibration isolator 2 of the present embodiment, as the diameter of the tubular member 22 gradually decreases from the lower side toward the upper side, the medium frequency vibration in the axial direction can be more reliably attenuated and absorbed.

The technical scope of the present invention is not limited to the above-described embodiments, and various modifications can be made without departing from the gist of the present invention.

In the above-described embodiments, the total of the opening areas of the first communication holes 42a opened in the inner portion 16f is larger than the total of the opening areas of the first communication holes 42a opened in the outer portion 16g, but the present invention is not limited to this, and for example, the total of the opening areas of the first communication holes 42a opened in the inner portion 16f may be equal to or smaller than the total of the opening areas of the first communication holes 42a opened in the outer portion 16g.

Further, the configuration in which the tubular member 21 is connected to the first wall surface 16b so as not to overlap the first communication holes 42a has been described, but the tubular member 21 may be connected to the first wall surface 16b in a state where the tubular member 21 overlaps the first communication holes 42a.

Further, the configuration in which the elastic body 13 is formed in a tubular shape extending in the axial direction has been described, but a configuration in which the elastic body 13 is formed in an annular plate shape having upper and lower surfaces may be adopted.

Further, the recessed portion is formed in the upper wall surface of the partition member 16, but the recessed portion may be omitted.

Further, in the above-described embodiments, the vibration isolator 1, 2 of the compression type in which a positive pressure acts on the main liquid chamber 14 when a support load acts thereon has been described, but the present invention is also applicable to a vibration isolator of a suspension type which is installed such that the main liquid chamber 14 is positioned on a lower side in the vertical direction and the auxiliary liquid chamber 15 is positioned on an upper side in the vertical direction and in which a negative pressure acts on the main liquid chamber 14 when a support load acts thereon.

Further, the vibration isolator 1, 2 according to the present invention is not limited to the engine mount of vehicles and may be applied to mounts other than the engine mount. For example, the present invention can be applied to a generator mount mounted on a construction machine, or to a machine mount installed in a factory or the like.

According to the present invention, as the tubular member that protrudes toward the elastic body is provided on the first wall surface of the partition member, when the elastic body deforms in the secondary vibration mode due to input of the medium frequency vibration in the axial direction, in the vertical cross-sectional view thereof along the axial direction, since a node, which is conventionally generated in the middle portion of the elastic body, is shifted to the second mounting member side due to, for example, the fact that the liquid between the inner circumferential surface of the main liquid chamber and the outer circumferential surface of the tubular member becomes difficult to flow, a portion of the elastic body positioned on the first mounting member side of the node is more easily deformed compared with a portion of the elastic body positioned on the second mounting member side of the node. Thereby, as the portion of the elastic body positioned on the first mounting member side of the node is positively deformed when the medium frequency vibration is input in the axial direction, the apparent rigidity of the elastic body can be reduced, and this vibration can be attenuated and absorbed.

Further, as the plurality of first communication holes are opened in both of the inner portion of the first wall surface positioned inside the tubular member and the outer portion of the first wall surface positioned outside the tubular member, many first communication holes can be arranged in the first wall surface, and for example, the idle vibration having a relatively high frequency among low frequency vibrations can be reliably attenuated and absorbed.

The length of the tubular member in the axial direction may be equal to or larger than 20% of the maximum height of the main liquid chamber in the axial direction.

In this case, it is possible to reliably achieve the above-described effect.

Further, the inner diameter of the tubular member may be equal to or larger than half of the maximum inner diameter of the main liquid chamber.

In this case, it is possible to reliably achieve the above-described effect.

Further, the diameter of the tubular member may gradually decrease as it goes in the axial direction from the first wall surface side toward the elastic body side.

In this case, it is possible to reliably achieve the above-described effect.

In addition, the components in the above-described embodiments can be appropriately replaced with known components without departing from the spirit and scope of the present invention, and furthermore, the above-described modified examples may be appropriately combined.

INDUSTRIAL APPLICABILITY

By applying the vibration isolator of the present invention to the field, medium frequency vibrations can be attenuated and absorbed.

REFERENCE SIGNS LIST 1, 2 Vibration isolator
11 First mounting member
12 Second mounting member
13 Elastic body
14 Main liquid chamber
Auxiliary liquid chamber
16 Partition member
16b First wall surface
16f Inner portion (portion positioned inside the tubular member)
16g Outer portion (portion positioned outside the tubular member)
19 Liquid chamber
21, 22 Tubular member
24 Orifice passage
41 Movable member
42 Accommodation chamber
42a First communication hole
42b Second communication hole
O Central axis
R Maximum inner diameter
T Maximum height

The invention claimed is:

1. A vibration isolator comprising:
a tubular first mounting member connected to one of a vibration generating unit and a vibration receiving unit and a second mounting member connected to the other thereof,
an elastic body elastically connecting the first and second mounting members to each other;
a partition member which partitions a liquid chamber in the first mounting member, in which liquid is sealed, into a main liquid chamber having the elastic body as part of a partition wall thereof and an auxiliary liquid chamber, the main liquid chamber and the auxiliary liquid chamber being disposed in an axial direction along a central axis of the first mounting member; and
a movable member accommodated in an accommodation chamber provided in the partition member so as to be deformable or displaceable,
wherein an orifice passage, a plurality of first communication holes, and a second communication hole are formed in the partition member, the orifice passage being configured to allow the main liquid chamber and the auxiliary liquid chamber to communicate with each other, the plurality of first communication holes being configured to allow the main liquid chamber and the accommodation chamber to communicate with each other, and the second communication hole being configured to allow the auxiliary liquid chamber and the accommodation chamber to communicate with each other,
a tubular member that protrudes in the axial direction toward the elastic body is formed on a first wall surface of the partition member in which the first communication holes are opened, the first wall surface constituting part of an inner surface of the main liquid chamber, and
the plurality of first communication holes are opened in both of an inner portion of the first wall surface positioned inside the tubular member and an outer portion of the first wall surface positioned outside the tubular member.

2. The vibration isolation device according to claim 1, wherein a length of the tubular member in the axial direction is equal to or larger than 20% of a maximum height of the main liquid chamber in the axial direction.

3. The vibration isolation device according to claim 2, wherein an inner diameter of the tubular member is equal to or larger than half of a maximum inner diameter of the main liquid chamber.

4. The vibration isolation device according to claim 3, wherein a diameter of the tubular member gradually decreases as it goes in the axial direction from the first wall surface side toward the elastic body side.

5. The vibration isolation device according to claim 2, wherein a diameter of the tubular member gradually decreases as it goes in the axial direction from the first wall surface side toward the elastic body side.

6. The vibration isolation device according to claim 1, wherein an inner diameter of the tubular member is equal to or larger than half of a maximum inner diameter of the main liquid chamber.

7. The vibration isolation device according to claim 6, wherein a diameter of the tubular member gradually decreases as it goes in the axial direction from the first wall surface side toward the elastic body side.

8. The vibration isolation device according to claim 1, wherein a diameter of the tubular member gradually decreases as it goes in the axial direction from the first wall surface side toward the elastic body side.

* * * * *